United States Patent
Bravo

[19]

[11] Patent Number: 5,875,684
[45] Date of Patent: Mar. 2, 1999

[54] GUIDE FOR A SELECTOR LEVER

[75] Inventor: Ernesto Bravo, Cambiano, Italy

[73] Assignee: Dr. Ing. h.c.F. Porsche AG, Weissach, Germany

[21] Appl. No.: 829,288

[22] Filed: Mar. 31, 1997

[30] Foreign Application Priority Data

Mar. 29, 1996 [IT] Italy .................................. TO96A0247

[51] Int. Cl.⁶ .................................................. B60K 20/04
[52] U.S. Cl. ..................................... 74/473.18; 74/473.25
[58] Field of Search ........................... 74/473.18, 473.25, 74/473.21

[56] References Cited

U.S. PATENT DOCUMENTS

| | | | |
|---|---|---|---|
| 4,326,432 | 4/1982 | Miller | 74/475 |
| 5,044,220 | 9/1991 | Raff et al. | 74/473 R |
| 5,062,314 | 11/1991 | Maier et al. | 74/475 |
| 5,622,079 | 4/1997 | Woeste et al. | 74/335 |
| 5,689,996 | 11/1997 | Ersoy | 74/335 |

FOREIGN PATENT DOCUMENTS

| | | |
|---|---|---|
| 0331797 A2 | 9/1989 | European Pat. Off. . |
| 0331797 A3 | 9/1989 | European Pat. Off. . |
| 0575658A1 | 12/1993 | European Pat. Off. . |
| 4426227C1 | 8/1995 | Germany . |

*Primary Examiner*—Charles A. Marmor
*Assistant Examiner*—David Fenstermacher
*Attorney, Agent, or Firm*—Evenson McKeown Edwards & Lenahan PLLC

[57] ABSTRACT

A selector lever guide assembly for a gearbox is provided, in which the selector lever is movable in two gear-shift gates which are parallel to each other and which are connected by a transverse gate. In order to guide the selector lever in such a way as to ensure a reliable positioning of the selector lever on leaving the first gear-shift gate and on re-entering the first gear-shift gate, a guide for the selector lever with the aid of a structural member is arranged immediately adjacent to the selector lever. This structural member has a face which extends in a plane parallel to the plane of movement of the selector lever. A guide member provided directly on the selector lever engages over the structural member and rests against the side of the face remote from the selector lever, so that the selector lever is guided in the plane of movement thereof. For the transverse movement of the selector lever, an aperture is provided at that point on the face at which the guide member is present when the selector lever is at the level of the transverse gate.

16 Claims, 2 Drawing Sheets

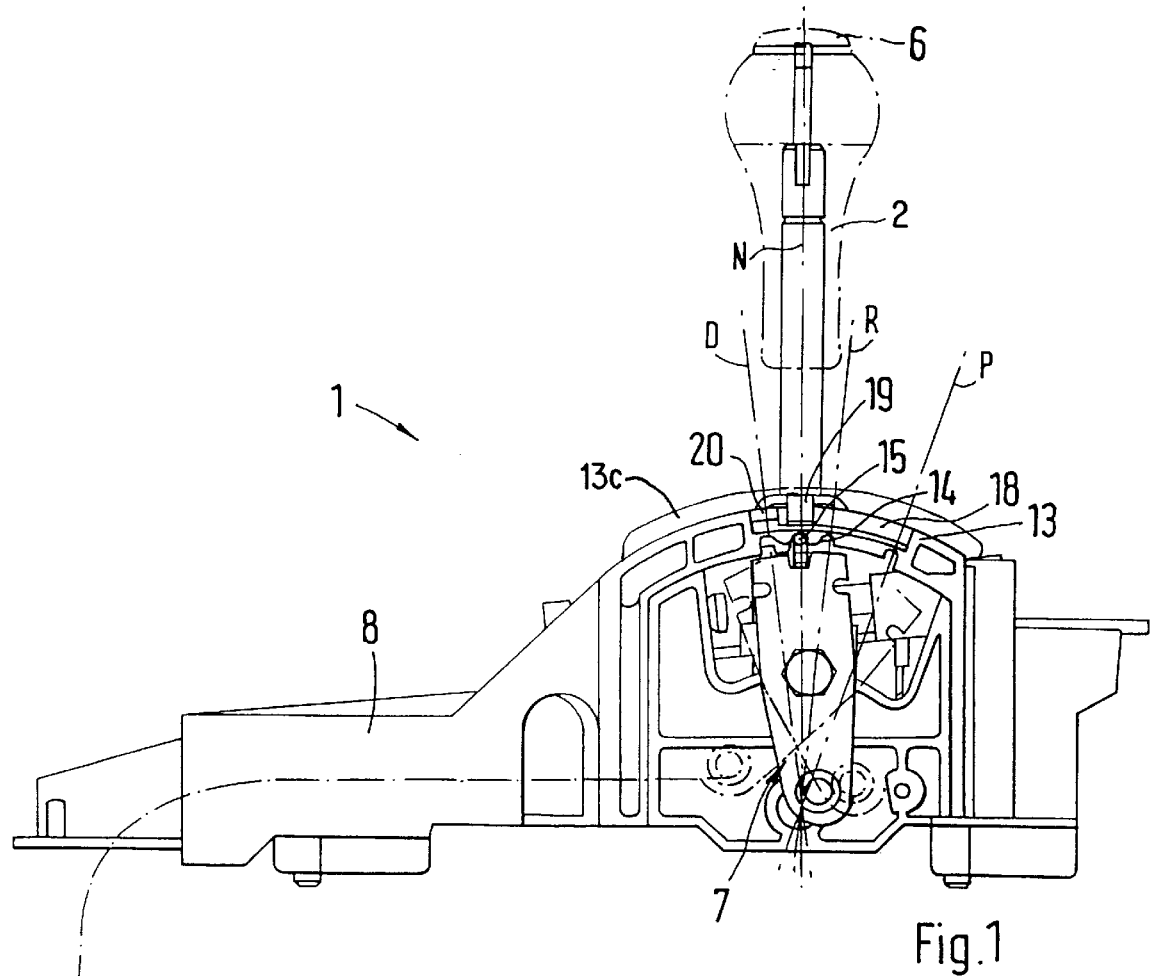
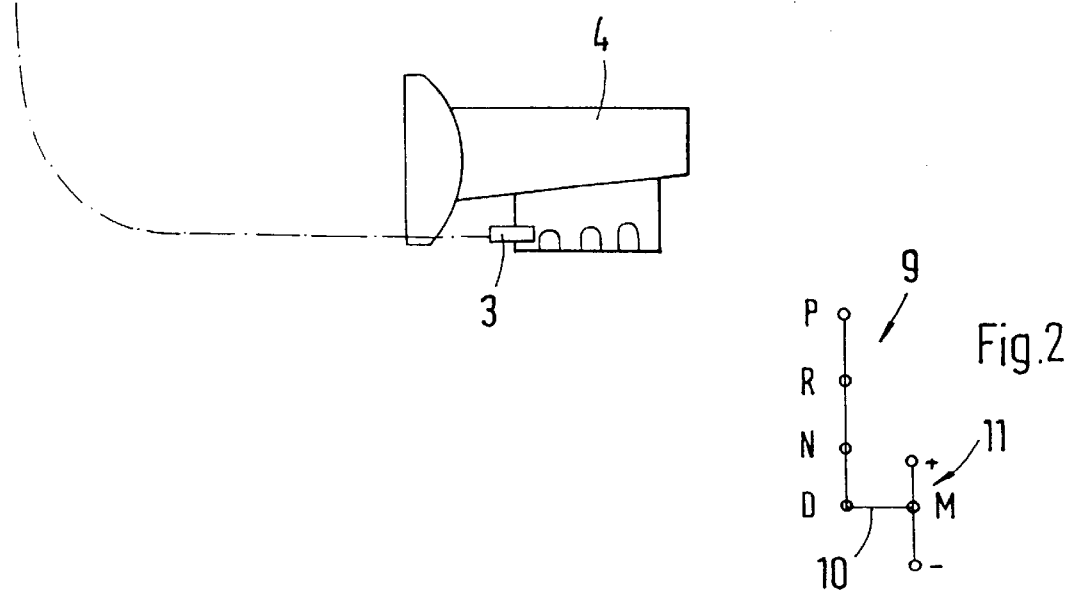
Fig.1
Fig.2

GUIDE FOR A SELECTOR LEVER

BACKGROUND AND SUMMARY OF THE INVENTION

This application claims the priority of Italian application TO 96 A 000247 filed Mar. 29, 1996 in Italy, the disclosure of which is expressly incorporated by reference herein.

The invention relates to a guide for a selector lever for a gearbox, in which the selector lever is movable in two gear-shift gates which are parallel to each other and which are connected by a transverse gate.

A selector lever of this type is already known from European Patent Document EP O 331 797 B1. The selection device shown there for an automatic gearbox has a selector lever which is pivotable in two gear-shift gates. When the selector lever is in the first gear-shift gate it acts directly upon the automatic gearbox by means of a transmission device. When the selector lever is shifted into the second gear-shift gate it is detached from the transmission device, and a locking device prevents the transmission device from being moved in an undesired manner out of the intended position.

Other generally known selector-lever guides, such as for example the guidance of the selector lever in a guide slot in a cover, have such large tolerances that a precise guidance of the selector lever is not possible.

An object of the invention is to guide a selector lever in such a way as to ensure a reliable positioning of the selector lever on leaving the first gear-shift gate and on re-entering the first gear-shift gate.

It is proposed according to the invention to design a guide for the selector lever with the aid of a structural member which is arranged immediately adjacent to the selector lever. This structural member has a face which extends in a plane parallel to the plane of movement of the selector lever. A guide member provided directly on the selector lever engages over the structural member and rests against the side of the face remote from the selector lever, so that the selector lever is guided in the plane of movement thereof. For the transverse movement of the selector lever, an aperture is provided at that point on the face at which the guide member is present when the selector lever is at the level of the transverse gate. A guide formed in this way for a selector lever is simple in design, is simple to assemble without requiring additional adjustment, and can be manufactured in an expedient manner without the precision of the guidance of the selector lever being adversely affected in this case.

The preferred embodiments of the invention include further advantageous features. In this connection, it is proposed that the width of the aperture should correspond to the width of the guide member, and the length of the aperture should be adapted to the movement requirement of the selector lever for pivoting from the first gear-shift gate into the second gear-shift gate, in such a way that a longitudinal displacement of the selector lever is possible again only when the said selector lever has reached the second gear-shift gate. Since it is now impossible to move the selector lever out of the second gear-shift gate into an undefined position, the precision of the guidance of the selector lever is further improved.

The guidance of the selector lever can be further improved by constructing the guide as part of the housing of the selection device. It is therefore unnecessary to adjust the guide.

The guide is preferably arranged in such a way that it comes to rest below a cover for the selection device. In this way, it is protected from soiling and damage, and foreign bodies are prevented from penetrating into the guide and obstructing the movement of the selector lever.

Other objects, advantages and novel features of the present invention will become apparent from the following detailed description of the invention when considered in conjunction with the accompanying drawings.

BRIEF DESCRIPTION OF THE DRAWINGS

FIG. 1 is an overall schematic view of a selection device which is connected to an automatic gearbox, constructed according to a preferred embodiment of the present invention;

FIG. 2 is a gear-shift diagram of a selector lever in the selection device according to FIG. 1;

DETAILED DESCRIPTION OF THE DRAWINGS

Figure 3:
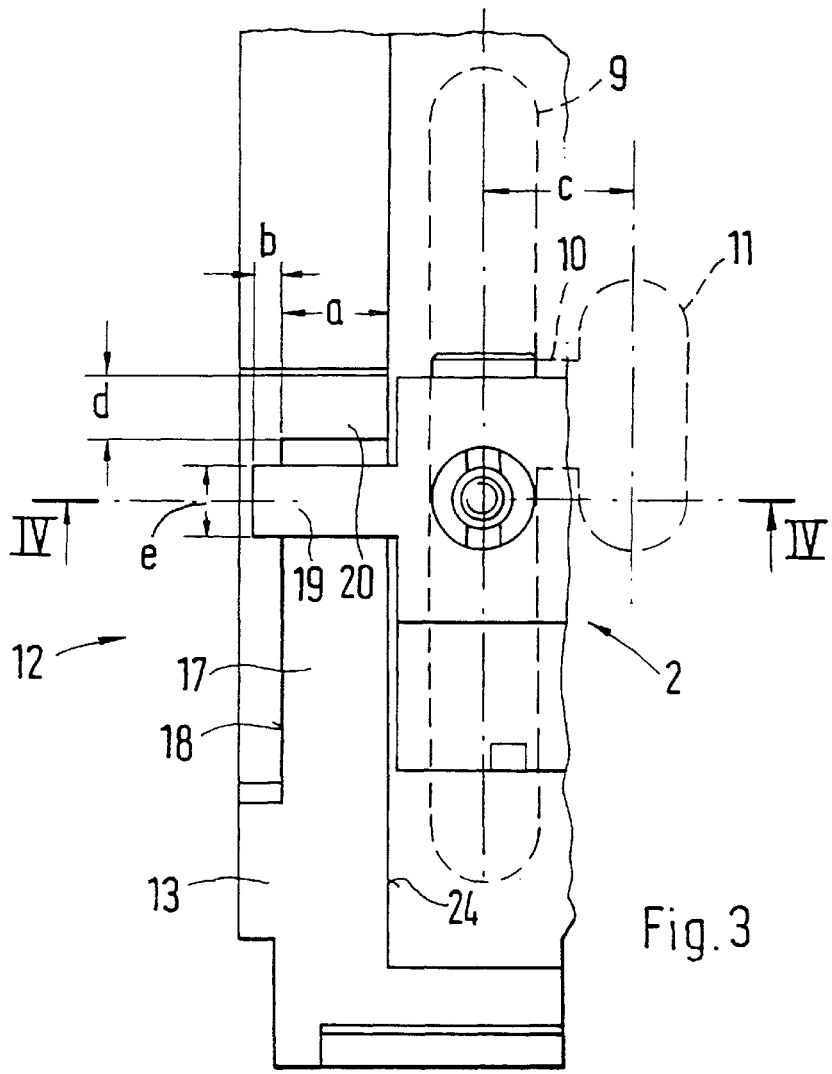
FIG. 3 is a plan view of the selector lever with a guide according to the invention.
Figure 4:
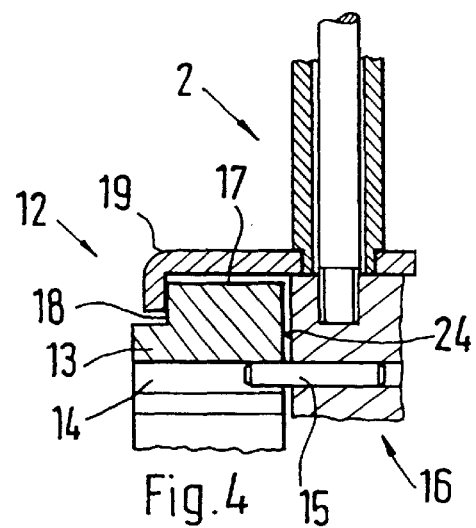
FIG. 4 is a section along the line IV—IV in FIG. 3.

The overall view given in FIG. 1 shows a selection device 1 which is connected to a control slide 3 of an automatic gearbox 4 by a Bowden cable 5 acting as a transmission means. The selection device 1 comprises a selector lever 2, which has a push button 6, a transmission member 7, which is connected to the Bowden cable 5, and a housing 8.

As shown in the gear-shift diagram shown in FIG. 2, the selector lever 2 movable. A first gear-shift gate 9 has the positions P=parking, R=reverse, N=neutral and D=drive, as known in a conventional manner for the automatic operation of the automatic gearbox 4. The selector lever 2 can be pivoted by way of a transverse gate 10 into the second gear-shift gate 11 which is arranged parallel to the first gear-shift gate 9. In the second gear-shift gate 11 the selector lever 2 occupies a neutral position M under the action of a spring and can be moved out of the position M by longitudinal pivoting inside the second gear-shift gate 11 into a position "+" or in the opposite direction into a position "−". When the selector lever 2 reaches the position "+" a shift up in the automatic gearbox 4 is initiated; when the position "−" is reached, a shift down is initiated.

As shown in greater detail in FIG. 3, the selector lever 2 is guided by means of a guide 12 in accordance with the gear-shift diagram given above. In this case the gear-shift gates 9 to 11 are formed in a cover (not shown) which covers the selection device 1 in the fitted state and in this case also covers the guide 12. The guide 12 is formed by a bridge 13 of the selection device 1 which is arranged adjacent to the selector lever 2 in the first gear-shift gate 9, it being possible for the selector lever 2 to rest against the first face 24 of the selection device 1 associated with the said selector lever 2. The bridge 13 is an integral component of the housing 8. Depressions 14, into which a pin 15 of a locking device 16 engages, are provided on the underside of the bridge 13. The selector lever 1 is secured in the pre-set positions in the first gear-shift gate 9 by the cooperation of the locking device 16 with the depressions 14. In this way, as shown in the illustration according to FIG. 1, the selector lever 2 is held in the position N.

The bridge 13 has an upper face 17 and a second face 18 which is arranged parallel to the first face 24 and therefore parallel to the pattern of movement of the selector lever 2 in the first gear-shift gate 9. A guide member 19 attached to the selector lever 2 rests against the second face 18. The upper face 17 is formed in such a way that the guide member 19 can move freely. For this purpose it is possible, but not absolutely necessary, for the upper face 17 to extend parallel to the pattern of movement of the guide member 19.

At the level of the transverse gate 10 the second face 18 terminates in an aperture 20, the width d of which corresponds to the width e of the guide member 19. The length a of the aperture 20 is defined by the distance c of the first gear-shift gate 9 and the second gear-shift gate 11 minus the thickness b of the guide member 19. The result of this is that in the second gear-shift gate 11 the guide member 19 rests against the first face 24 and the selector lever 2 is guided thereby.

For the first gear-shift gate 9 a precise guidance of the selector lever 2 is achieved with the guide 12 by the abutment of the selector lever 2 against the first face 24 on the one hand and by the abutment of the guide member 19 against the second face 18 on the other hand. During the pivoting of the selector lever 2 through the transverse gate 10 the selector lever 2 is guided in a precise manner in the aperture 20 by the guide member 19 connected to the said selector lever, until the second gear-shift gate 11 is reached. In the second gear-shift gate 11 the selector lever 2 is guided at least by the abutment of the guide member 19 on the first face 24.

The selector lever 2 is connected mechanically to the gearbox 4 in the first gear-shift gate 9 of the transmission member 7 and the Bowden cable 5. This connection is discontinued when passing through the transverse gate 10, and in the second gear-shift gate 11 this connection is broken off completely. The guide 12 illustrated ensures that the selector lever 2 returns to the first gear-shift gate 9 in exactly the same position in which it left the first gearshift gate 9.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A selector lever guide assembly for a gearbox, comprising:

a housing, and a selector lever movable in two gear-shift gates parallel to each other and connected by a transverse gate, wherein a structural member fixed with said housing and arranged adjacent to the selector lever has a face extending in a plane parallel to the first gear-shift gate, wherein a guide member is fixed to the selector lever, said guide member resting against and guided by a side of the face of the structural member remote from the selector lever, and wherein the face has an aperture defining the transverse gate and the guide member is movable in said transverse gate when the selector lever is moved between said gear shift gates.

2. An assembly according to claim 1, wherein a width of the aperture corresponds to a width of the guide member, and wherein a length of the aperture is selected to be such that the guide member and therefore the selector lever are released from the aperture only when the second gear-shift gate is reached.

3. An assembly according to claim 2, wherein the structural member is part of a housing for receiving the selector level.

4. An assembly according to claim 2, wherein the structural member has recesses for locking the selector lever in pre-set positions.

5. An assembly according to claim 4, wherein the structural member is part of a housing for receiving the selector lever.

6. An assembly according to claim 2, wherein the selector lever rests against a further face of the structural member when the selector lever is present in the first gear-shift gate, said two faces of the structural member being arranged parallel to each other.

7. An assembly according to claim 2, comprising a covering member above the structural member.

8. An assembly according to claim 1, wherein the structural member is part of a housing for receiving the selector lever.

9. An assembly according to claim 8, comprising a covering member above the structural member.

10. An assembly according to claim 1, wherein the structural member has recesses for locking the selector lever in pre-set positions.

11. An assembly according to claim 10, wherein the selector lever rests against a further face of the structural member when the selector lever is present in the first gear-shift gate, said two faces of the structural member being arranged parallel to each other.

12. An assembly according to claim 11, wherein the structural member is part of a housing for receiving the selector lever.

13. An assembly according to claim 1, comprising a covering member above the structural member.

14. An assembly according to claim 1, wherein the selector lever rests against a further face of the structural member when the selector lever is present in the first gear-shift gate, said two faces of the structural member being arranged parallel to each other.

15. An assembly according to claim 14, comprising a covering member above the structural member.

16. An assembly according to claim 14, wherein the structural member is part of a housing for receiving the selector lever.

* * * * *